Sept. 22, 1936.  A. RIEBE  2,054,912
JOURNAL BEARING
Filed March 29, 1934   2 Sheets-Sheet 1
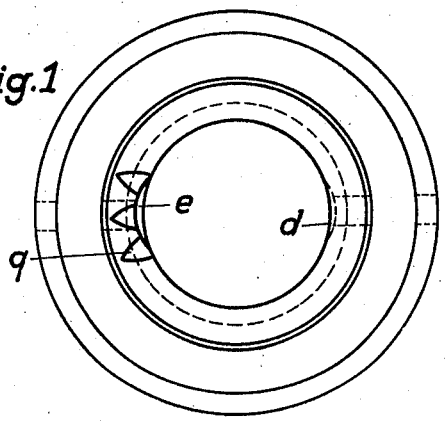
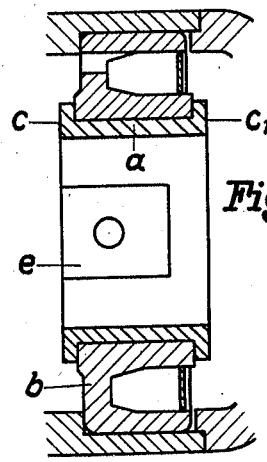
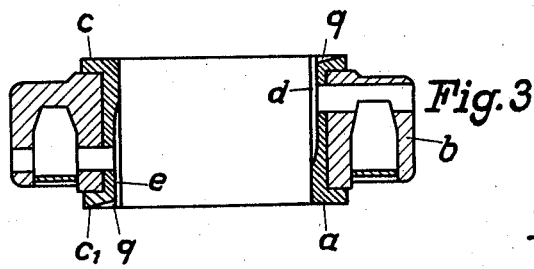
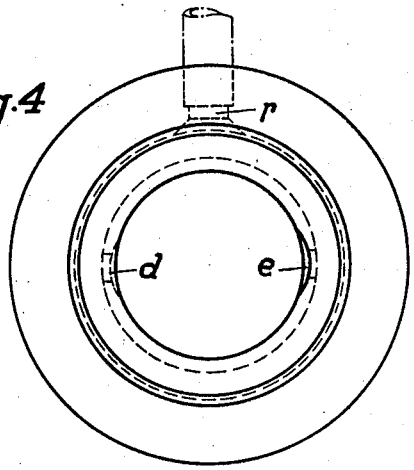
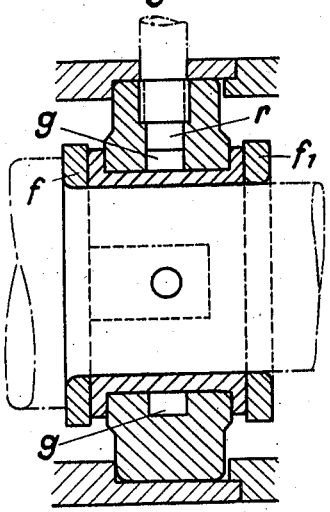
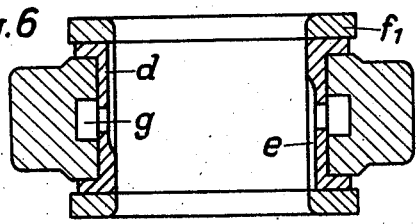
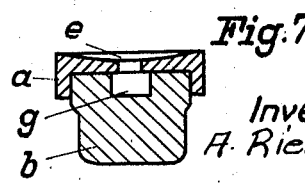
Inventor:
A. Riebe
By: Marks & Clerk
Attys.

Patented Sept. 22, 1936

2,054,912

UNITED STATES PATENT OFFICE 2,054,912

JOURNAL BEARING

August Riebe, Berlin-Schmockwitz, Germany

Application March 29, 1934, Serial No. 718,017
In Germany March 31, 1933

4 Claims. (Cl. 308—126)

Journal bearings of a very short length are known, having about the length of ball bearings. With bearings of this kind the lubricant is usually fed directly to the sliding surfaces by way of openings in the bushings, the lubricant being supplied by means of wicks, pumps or the like. For bearings which, besides the cylindrical sliding surface, have also sliding surfaces at the ends of the bushing in order to take up axial pressure by means of collars attached to the shaft, the lubrication referred to will not be sufficient if the speed of rotation or the load of the bearing becomes very high. Moreover the lubricating means becomes too cumbersome if good lubrication is to be obtained in spite of high speed.

The object of my invention is to improve journal bearings of the type referred to by providing specially formed lubricating means for the sliding surfaces of the journal bearing as well as for the thrust bearing combined therewith. These lubricating means, which can be manufactured very easily, absolutely guarantee an adequate lubrication. According to my invention the hole in the bushing for feeding the oil communicates with recesses located in the sliding surface, these recesses having the form of oil pockets. The oil feeding itself is also improved by special means.

According to the invention the recesses are either open towards the ends of the bushing or they extend to almost the ends of the bushing, thus enabling the lubricant to enter the sliding surfaces at the front part of the bearing which part takes up the axial pressure. In order to obtain a uniform distribution of the oil as well over the front part of the bushing as over the cylindrical sliding surface of same the recesses are made decreasing from a maximum depth at the center to extreme thinness at the edges.

The drawings show my invention by way of example. They also show several of the improvements in detail.

Figure 8:
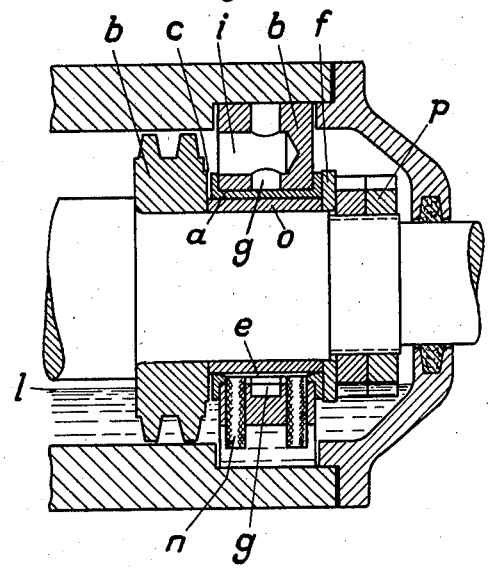
Figure 9:
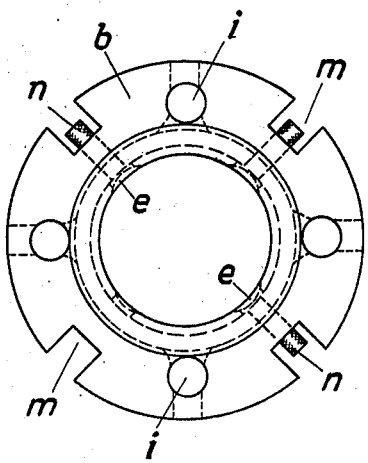
Figure 10:
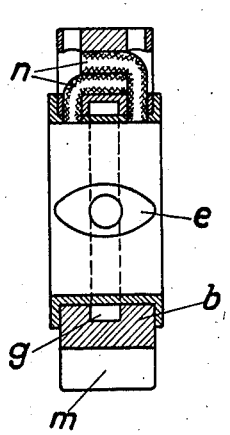
Figure 11:
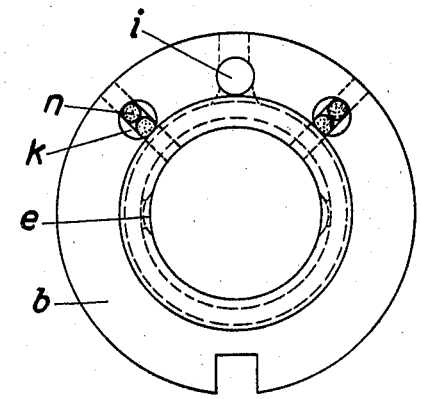

Figs. 1, 2 and 3 show a journal bearing having an annular space for feeding the lubricant to the sliding surfaces, this feeding can be done by way of lubricating wicks. Fig. 4 is a front view of the bearing. Figs. 5 and 6 show a bearing to which the oil may be supplied by oil feeding devices of any kind. Fig. 7 shows another kind of oil pockets. Fig. 8 shows a bearing having a screw or worm as oil feeding device; Figs. 9, 10 and 11 show how the oil feeding may also be done by wicks together with the oil feeding device of Fig. 8.

In Figs. 1, 2 and 3 the bushing $a$, attached to the annular member $b$ by means of flanges, has front surfaces $c$ and $c_1$ serving as sliding surfaces for taking up axial pressure.

The oil which is in the space $g$ of the annular member $b$ enters the recesses $e$ and $d$ of the cylindrical sliding surface by way of bores. In Figs. 1 to 3 these recesses are open towards the ends of the bushing, one recess being open towards the one end and the other recess towards the other end of the bushing.

In order to prevent too fast a flowing of the oil to the end surfaces of the bushing, the recesses may be formed as shown in Fig. 7. These recesses $e$ do not quite reach the edges of the end of the bushing but decrease gradually. Recesses of this kind can be cut out very easily by means of a milling cutter having a barrel shaped surface, these recesses also decreasing in depth gradually in the direction of the cylindrical sliding surface. Thus recesses will be obtained having the shape shown in Fig. 10 in plan view.

By giving the recesses an adequate depth and width the bearing will always have a sufficient oil supply and by sloping the edge between the recesses and the sliding surface an interruption of the oil layer at this place will be avoided. Experiments have shown that the most efficient construction is to make the angle between the walls of the recess and the sliding surface an angle of about 10 to 20°.

In the bearing of Figs. 7 and 10 the recesses are located at about the middle of the length of the bearing. Figs. 1 and 3 show a bearing with recesses located more towards the ends of the bushing. In this case it is advantageous to have the recesses extend over the middle of the bearing, as Figs. 2 and 3 show, thus producing a greater oil supply in the middle of the bearing where the load is greatest.

The recesses are preferably provided about at the horizontal middle plane of the bearing, this arrangement being suitable if the load is applied vertically as the recesses will thus be located in the unloaded part of the bearing.

It is advantageous to have the recesses decrease in depth gradually in both directions of rotation, thus giving a good lubrication even when the direction of rotation is reversed or if the direction of the pressure applied changes as is the case with crank pin bearings for example.

As shown in Figs. 1 to 3 the oil may be fed from the oil reservoir in the annular member $b$ to the oil pockets by way of holes. In Figs. 4 to 11 bearings are shown in which the oil enters the oil pockets from an annular channel $g$, this channel being supplied with oil by oil feeding devices of any kind, for example by an oil line connected to the bore $r$, this oil line leading to a high-placed oil reservoir or to an oil pump. In Fig. 8 another oil feeding device is shown, which will be described later. It is advantageous to carefully round-off the edges between the oil feeding openings $r$ and the annular channel $g$ in order to avoid throttling of the oil flow.

According to the invention the lubrication of the ends of the bushing may be improved by interconnecting the recesses $e$ and $d$ to grooves $q$ located at these ends. These grooves may decrease in depth gradually outwardly, thus producing a wedge-shaped oil layer at the sliding surfaces of the ends.

The oil passes through the bores, provided therefor, to the recesses, thus lubricating the cylindrical sliding surface and then it flows to the end surfaces $c$ and $c_1$. The superfluous oil runs over these end surfaces outwards being collected in an oil sump, from where it may be brought back to the sliding surfaces by wicks or pumps.

In order to enable the bearing to take up axial pressure in both directions the oil pockets may be arranged according to Fig. 7 or they may be made open towards different directions of the cylindrical sliding surface, as Fig. 3 shows. If axial pressure is to be taken up only in one direction, for example by means of a thrust ring $f$ (Fig. 5), the oil will flow out too easily at the other side by way of the recess which is open at that side. To prevent this, at the latter side of the bearing a ring $f_1$ (see Figs. 5 and 6) may be attached to the bushing whose task it is to throttle the oil flow as long as this ring is not under pressure. But this ring may be left out too, as in general the lubrication of the bearing will be sufficient without this throttling.

In the bearing according to Figs. 1 to 3 annular spaces have been provided in the annular member $b$, this space serving as an oil reservoir. Usually this annular space will be filled with wicks, which accumulate the oil, feeding it to the recesses $d$ and $e$ by way of the bores which in their turn may also be filled out with wicks.

If the bearing is loaded heavily the oil supply, by way of the wicks, will sometimes not be sufficient. For bearings of this kind Fig. 8 shows an example of construction where a screw or worm $h$ has been provided on the shaft. This screw has a right-handed or left-handed thread according to the direction of rotation of the shaft. Its lower part is immersed in the oil, in the lower part of the casing.

This screw or worm is attached to the shaft by means of a bushing $o$, a thrust ring $f$ and nuts $p$.

This screw or worm may be designed so that it serves also as a thrust ring.

When the shaft rotates the oil is taken up by the screw and is thrown against the end of the member $b$. From there it passes through the openings $i$ to the annular channel $g$ and then to the recesses $e$. From these recesses the oil flows, as described above, to the sliding surfaces on the ends of the bearing, against which either the screw $h$ or the thrust ring $f$ rests. The oil running down from the end faces flows back to the oil sump.

By this arrangement a very efficient lubrication is obtained when the journal is rotating. But it is necessary to also produce an oil layer in the bearing at the moment, when the bearing starts operating, in order to prevent insufficient lubrication or half-dry friction during the starting process.

For these reasons, besides the holes $i$, other openings or holes $k$ have been provided in the annular member $b$, these holes $k$ being filled out with wicks $n$. When the bearing is operating these wicks $n$ suck up the oil thrown against the member $b$, thus filling the recesses $e$ with oil. In this way the recesses are filled with oil even when the bearing is not moving, thus always guaranteeing a sufficient oil supply between the sliding surfaces when the bearing is starting.

Thus in the bearing two lubricating systems are provided which are independent of each other. The one system will supply the necessary oil by way of the openings $k$ and the wicks $n$ when the bearing is starting while the other will produce a very efficient oil circulation by way of the bores $i$ and the annular channel $g$ when the bearing is in motion. In order to avoid all obstacles in this oil circulation the edges of the oil feeding channels $i$ and the annular channel $g$ are well rounded off. In this way throttling of the oil flow is avoided thus making it possible to have a sufficient oil supply with a low oil pressure.

It may be advantageous to increase the oil accumulated in the oil wicks in order to have a sufficient oil supply when the bearing is starting. For this purpose the wicks may be bent as shown in Fig. 10. Thus a greater volume of the wicks and consequently a greater capacity for taking up oil will be obtained without increasing the dimensions of the annular member $b$ of the bearing.

In order to provide a free passage for the oil from the one side of the annular member $b$ to the other, openings $k$ and $m$ are provided leading from one side of this member to the other. To be independent of a special position of the annular member $b$ in the casing, several openings $i$, $k$ and $m$ have been provided thus making it possible to insert the annular member into the casing in any position and always have a good oil circulation.

The bearings according to the invention are specially adapted to be built-in into bearing casings in the same way as ball bearings. They have the same dimensions as these ball bearings, i. e. their length is very small compared with their diameter. On account of the improved lubricating means, described above, these bearings are able to take up very great loads thus being adaptable to all machines which are subjected to great strains.

Having now particularly described and ascertained the nature of my said invention I declare that what I claim is:

1. A bushing for short bearings having the dimensions of ball bearings, comprising an annular casing adapted to be placed in bearing housings, provided with sliding surfaces on the ends of the bushing and with a device for feeding oil to the sliding surfaces, an annular space being provided in said annular casing and communicating with recesses in the cylindrical sliding surface of the bushing through bores in said bushing, lubricating grooves in the bushing extending from one recess to one end face and from another recess to the other end face of the bushing said faces constituting thrust bearings so that the entire arrangement is adapted to permit the oil fed by the oil device to pass through said annular space through said recesses and thence to the cylindrical sliding surface and through the lubricating grooves to the front surfaces of the bushing.

2. A bushing for short bearings having the dimensions of ball bearings, comprising an annular casing adapted to be placed in bearing housings, provided with sliding surfaces on the ends of the bushing and with a device for feeding oil to the sliding surfaces, an annular space being provided in said annular casing and communicating with recesses in the cylindrical sliding surface of the bushing through bores in said bushing, the said bores adapted to permit oil to pass out on both end surfaces of the bearing through lubricating grooves provided therein and the oil feeding device comprising a worm arranged on the shaft and longitudinal bores in the annular casing adapted to feed the oil to the annular space so that the entire arrangement is adapted to permit the oil, fed by an oil feeding device, to pass through the annular space, through the recesses, and thence a part through the cylindrical sliding surface and another part through said lubricating grooves to the end surfaces of the bearing, said end surfaces constituting thrust bearings and the lubricating ducts being disposed symmetrically with respect to the bushing whereby the bushing is capable of reversing.

3. A bushing for short bearings having the dimensions of ball bearings, comprising an annular casing adapted to be placed in bearing housings, provided with sliding surfaces on the ends of the bushing and with a device for feeding oil to the sliding surfaces, an annular space being provided in said annular casing and communicating with recesses in the cylindrical sliding surface of the bushing through bores in said bushing, thrust rings mounted on the shaft one at each end of the bushing to throttle the flow of oil at that end of the bushing which is not loaded, the said bores adapted to permit oil to pass out to both end surfaces of the bearing through said lubricating grooves so that the entire arrangement is adapted to permit the oil, fed by the oil feeding device, to pass through the annular space, through the recesses, and thence a part to the cylindrical sliding surface and the other part through the lubricating grooves to the end surface of the bearing, said end surfaces constituting thrust bearings and the lubricating ducts being disposed symmetrically with respect to the bushing whereby the bushing is capable of reversing.

4. A bushing bearing according to claim 2 in which the worm is formed as a pressure surface.

AUGUST RIEBE.